United States Patent [19]

Reynolds et al.

[11] Patent Number: 4,567,785
[45] Date of Patent: Feb. 4, 1986

[54] DIRECTLY MOUNTED MASTER SHIFT CONTROL

[75] Inventors: Joseph D. Reynolds, Climax; Ernst H. Lauer, West Kalamazoo, both of Mich.

[73] Assignee: Eaton Corporation, Cleveland, Ohio

[21] Appl. No.: 562,362

[22] Filed: Dec. 16, 1983

[51] Int. Cl.[4] ............................................. G05G 5/10
[52] U.S. Cl. ...................................... 74/477; 74/475; 74/476
[58] Field of Search ......................... 74/475, 476, 477

[56] References Cited

U.S. PATENT DOCUMENTS

| | | | |
|---|---|---|---|
| Re. 28,017 | 5/1974 | Dence | 74/477 |
| 1,305,063 | 5/1919 | Church | 74/477 |
| 3,387,501 | 6/1968 | Frost | 74/335 |
| 3,929,029 | 12/1975 | Kelbel | 74/473 R |
| 3,934,485 | 1/1976 | Ratliff | 74/473 R |
| 4,022,078 | 5/1977 | Malott | 74/475 |
| 4,120,212 | 10/1978 | Philipsen | 74/476 |
| 4,132,125 | 1/1979 | Janiszewski | 74/477 |
| 4,273,004 | 6/1981 | Morrison et al. | 74/473 R |
| 4,296,642 | 10/1981 | Schetter | 74/475 |
| 4,320,670 | 3/1982 | Kawamoto | 74/477 |
| 4,472,868 | 9/1984 | Takahashi | 74/477 |

FOREIGN PATENT DOCUMENTS

| | | | |
|---|---|---|---|
| 1800163 | 4/1970 | Fed. Rep. of Germany | 74/477 |
| 252291 | 5/1926 | United Kingdom | 74/477 |

*Primary Examiner*—Allan D. Herrmann
*Attorney, Agent, or Firm*—C. H. Grace; H. D. Gordon

[57] ABSTRACT

A shift control mechanism (10) for use in cooperation with a shift bar housing assembly (16) of a change gear transmission of the type comprising a shift bar housing (14) in which a plurality of axially moveable shift rails (18, 20, 22 and 24) are mounted is provided. The shift control mechanism includes a control housing (12) in which a shift yoke (64) is pivotably mounted for pivotal movement about a pivot axis (68) in a direction (Y—Y) transverse the axes of the shift rails. A shift lever (48) carrying a shift finger (52) at one end thereof and a shift knob (56) at the other end thereof is pivotably mounted in the shift yoke about an independent pivot axis (62) for pivotal movement in the direction (X—X) parallel the axes of the shift rails relative to the shift yoke and control housing. The shift yoke defines a slot or gap (82) having a transverse width (80) greater than the transverse width (38) of any one of the shift rails but less than the combined transverse width of two of the shift rails through which the shift finger is pivotably moveable in the direction parallel the axes of the shift rails to provide a positive interlock mechanism. The shift yoke carries stops (98) and (100) for engagement with the outer shift rails (18 and 24) to limit pivotal movement of the shift lever and shift yoke and to provide positive indication of correct selection of the outer two shift rails (18 and 24). A spring biased detent mechanism (110) cooperates with a notched contact surface (112) to provide a feel for proper selection of the inner two shift rails (20 and 22).

13 Claims, 13 Drawing Figures

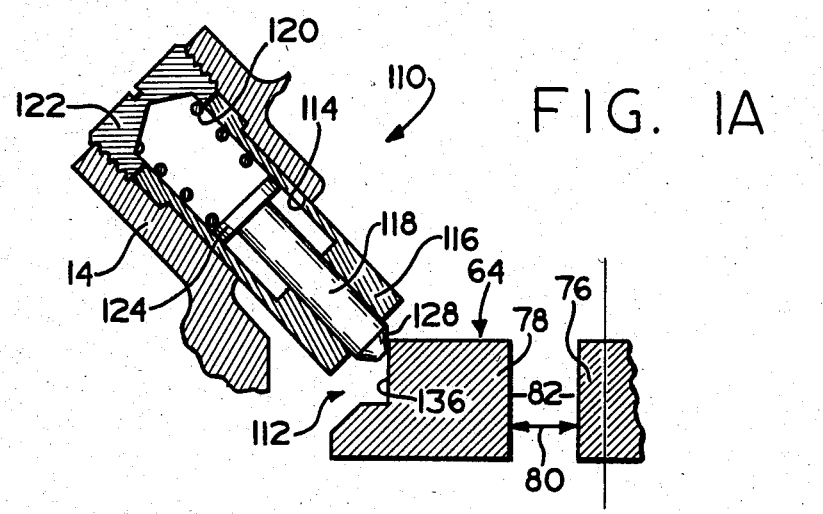
FIG. IA
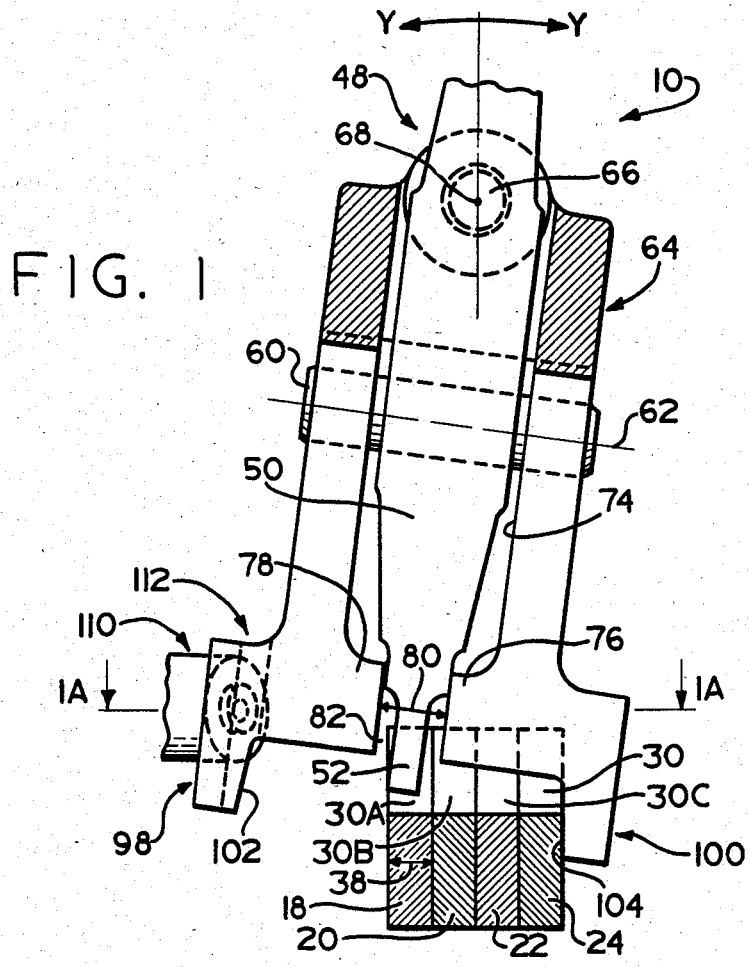
FIG. I

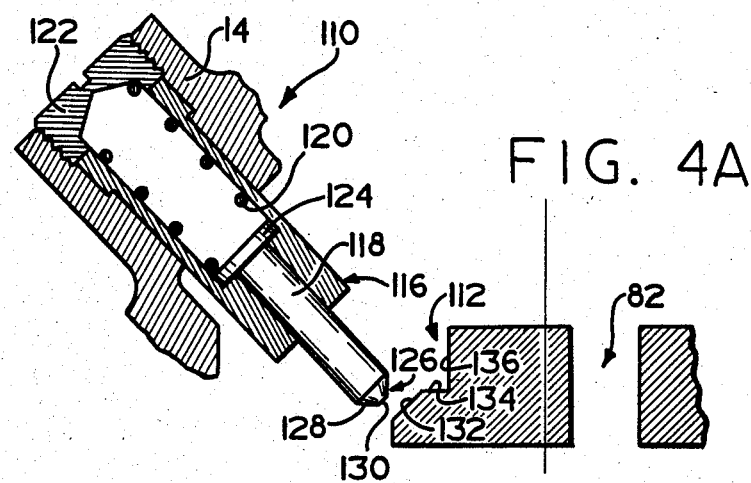
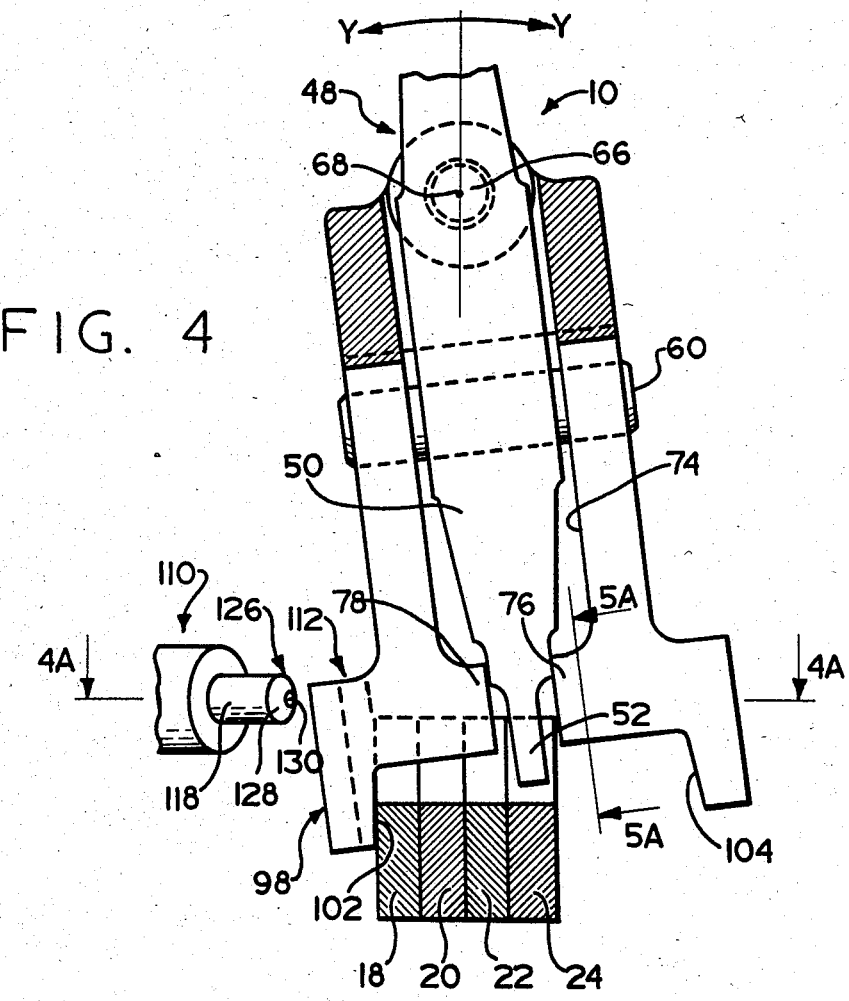

DIRECTLY MOUNTED MASTER SHIFT CONTROL

RELATED APPLICATIONS

This application is related to U.S. patent application Ser. No. 447,346 filed Dec. 6, 1982 and titled TRANSMISSION SHIFTING MECHANISM.

BACKGROUND OF THE INVENTION

1. Field of the Invention

The present invention relates to transmission shift control mechanisms, also commonly referred to gear selector mechanisms, for use in manually controlled transmissions. In particular, the present invention relates to directly mounted master shift control mechanisms which are relatively lightweight, simple and inexpensive.

2. Description of the Prior Art

Manually controlled change gear transmissions of both the sliding gear and/or sliding clutch type, and the shifting mechanisms for selective shifting thereof, are well known in the prior art. In recent years there have been many improvements relating to the shifting mechanisms for such sliding gear and/or sliding clutch type manual transmissions. However, there continues to be a need to provide a relatively inexpensive, relatively lightweight, simplified shifting mechanism for establishing desired shifting movement, for providing adequate feel for the operator to establish that a correct gear has been selected and for providing an optimized mechanical advantage and shift lever travel for both the "gear selection" and "gear engagement" modes of operation of the shift lever. Additionally, it is desirable to improve the simplicity and reliability of the interlock mechanisms utilized with transmission shifting mechanisms having a plurality of axially movable shift rails therein which interlock mechanisms prevent axial movement of more than one shift rail at a given time. There is also a continuing need to improve the reliability and serviceability of such transmission shifting mechanisms.

The use of rectangularly cross-sectionally shaped shift rails, also referred to as flat shift rails and flat shift bars, to simplify and reduce the expense of shift bar housing assemblies is known as may be seen by reference to U.S. Pat. No. 4,273,004, hereby incorporated by reference.

The use of pin and/or ball type interlock mechanisms is well known in the prior art as may be seen by reference to U.S. Pat. Nos. 3,387,501; 4,120,212 and 4,296,642, hereby all incorporated by reference. While such interlock mechanisms are functionally acceptable, they are not suited for all types of shifting mechanisms and/or tend to be complicated and/or expensive to manufacture and/or assemble.

Mechanisms for providing an operator with a feel for varification of proper shift rail selection when manually shifting a gear shift lever of a mechanical transmission by use of resilient yieldable means is known in the prior art as may be seen by reference to U.S. Pat. Nos. 3,934,485 and 4,022,078 both hereby incorporated by reference. While such prior art mechanisms are suitable for certain purposes, they tend to be complicated and/or expensive to manufacture, assemble and/or service and/or do not provide the operator with a feel positively indicating correct selection in a shift bar housing assembly having three, four or more shift rails.

Directly shifted transmissions wherein the transmission shifting mechanism comprises a shift lever or the like which is mounted directly in a tower assembly mounted to the transmission housing and wherein the transmission shifting lever directly engages the shift rails of the transmission shift bar housing are well known in the prior art as may be seen by reference to above mentioned U.S. Pat. No. 4,273,004. While such prior art mechanisms are well suited for certain situations, they were not well suited for certain situations, such as heavy duty synchronized transmissions, wherein a much greater mechanical advantage is required for gear engagement movement (i.e. to frictionally engage the synchronizer clutches) of the shift lever than is required for gear selection movement of the shift lever.

SUMMARY OF THE INVENTION

In accordance with the present invention, the drawbacks of the prior art are overcome or minimized by the provision of a directly mounted master transmission shift control mechanism which is relatively lightweight, relatively simple and relatively inexpensive. The transmission shift control mechanism is especially well suited for use in connection with a shift bar housing assembly including a plurality of relatively flat shift rails mounted in side-by-side relationship and provides the operator with a feel positively indicating correction selection in a shift bar housing assembly having three or four shift rails. The transmission shift control mechanism also allows the provision of independent mechanical advantage/shift lever travel in the "gear selection" and "gear engagement" modes of operation. The shift control mechanism also provides a relatively simple and positive interlock mechanism to positively prevent movement of more than one shift rail at a time from the neutral positions thereof.

The above is accomplished by utilizing a shift yoke member or block which is pivotably mounted in, or relative to, a transmission shift bar housing assembly for pivotal movement in a plane generally transverse to the axes of a plurality of generally side-by-side flat shift rails each of which carry a shift fork or other shifting elements thereon. Each of the shift rails is provided with a shift block notch for engagement by a shift finger of a shift lever which is pivotably mounted in the shift yoke for pivotable movement in a plane substantially parallel to the axes of flat shift rails. The shift yoke block is provided with a slot extending generally parallelly with the axes of the flat shift rails through which the shift finger is pivotably moveable for engagement with an aligned shift block notch. The slot in the shift yoke block is of a transverse width greater than the transverse thickness of one shift rail but less than the transverse thickness of two shift rails whereby only the one shift rail aligned with the shift finger will be permitted axial movement from the neutral position thereof to provide a relatively simple and positive interlock structure.

Movement of the shift lever in a direction generally transverse the axes of the shift rails will result in pivotable movement of the shift lever and shift yoke block as a unit to align the shift finger and slot in the shift yoke block with a selected shift rail. This is the "gear selection" mode of operation of the transmission shift control. Movement of the shift lever in a direction generally parallel the axes of the shift rails will result in pivotable movement of the shift lever and shift finger carried thereby relative to the shift bar housing and the shift yoke block to engage the selected shift rail to axially move same from the neutral position thereof. This is the "gear engagement" mode of operation of the transmission shift control.

As the gear selection and gear engagement modes of operation of the shift control involve pivotable movement about separate, independent pivot axes, the transmission shift control may be designed to provide independent mechanical advantage in each of the modes of operation thereof. Typically, it is desirable to provide a greater mechanical advantage for the operator in the gear engagement mode of operation than in the gear selection mode of operation. This is especially true in synchronized heavy duty transmissions wherein a relatively large axial force on the shift rail is required to fully frictionally engage the frictional synchronizing clutches as is well known in the prior art. Also, it is usually desirable to minimize the required travel of the shift lever in the gear selection mode of operation as space in the vehicle cab is often limited and the gear selection mode of operation requires a relatively small force.

The shift yoke block is provided with stops on opposite transverse sides thereof each of which will engage one of the outer shift rails when the shift yoke block and shift lever assembly is pivoted in the gear selection mode of operation to align the shift finger and slot with the opposite side outer shift rail thereby limiting pivotal movement of the shift yoke block and providing a positive indication of proper selection of the two outer shift rails. The shift yoke block is provided with a ramp or stepped surface which is engageable with a spring biased plunger member mounted in the shift bar housing assembly. The ramp surface on the shift yoke block will just engage the plunger member when the slot and shift finger is correctly aligned with one of the inner shift rails and the shift yoke block may be moved toward the spring biased plunger to resiliently deflect same until the plunger engages a step notch on the shift block yoke to define proper alignment of the shift finger and slot with a second of the inner shift rails. Preferably, movement of the shift yoke further towards the spring biased detent plunger will be required to select the outer shift rail associated with the transmission reverse speed and the spring biased plunger will be effective to eject the lever from alignment with said shift rail to prevent accidental engagement with reverse gear. Of course, the bias of the spring biased plunger and/or the angles of the engaged ramps may be modified to provide a desired feel for the operator.

Accordingly, it is an object of the present invention to provide the relatively lightweight, simple, inexpensive and reliable directly mounted transmission shift control mechanism utilizing a relatively simple interlock structure and permitting independent mechanical advantage in the gear selection and gear engagement modes of operation thereof.

Another object of the present invention is to provide an improved transmission shift control mechanism, preferably for use with a shift bar housing assembly utilizing side-by-side flat shift rails, having a relatively simple and reliable interlock mechanism, allowing the use of independent mechanical advantage in both the gear selection and gear engagement modes of operation and providing the operator with a positive indication of correct selection of a desired shift rail.

These and other objects and advantages of the present invention will become apparent from a reading of the detailed description of the invention taken in connection with the attached drawings.

BRIEF DESCRIPTION OF THE DRAWINGS

FIGS. 1-4 are fragmentary front views, partially in section, of the directly mounted transmission shift control of the present invention, taken substantially along line 1—1 in FIG. 5, in four "gear selection" positions thereof.

FIGS. 1A-4A are partial sectional views taken along lines 1A—1A, 2A—2A, 3A—3A and 4A—4A, respectively, in FIGS. 1, 2, 3 and 4, respectively.

DETAILED DESCRIPTION OF THE PREFERRED EMBODIMENT

Figure 2A:
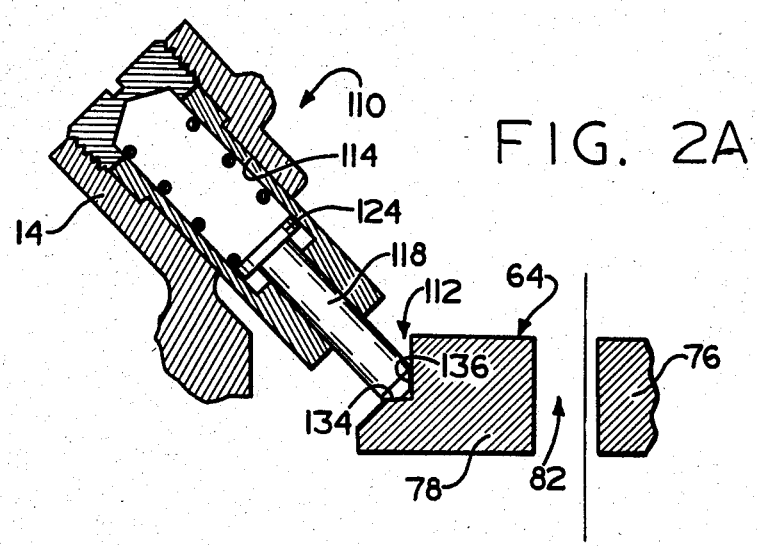
Figure 2:
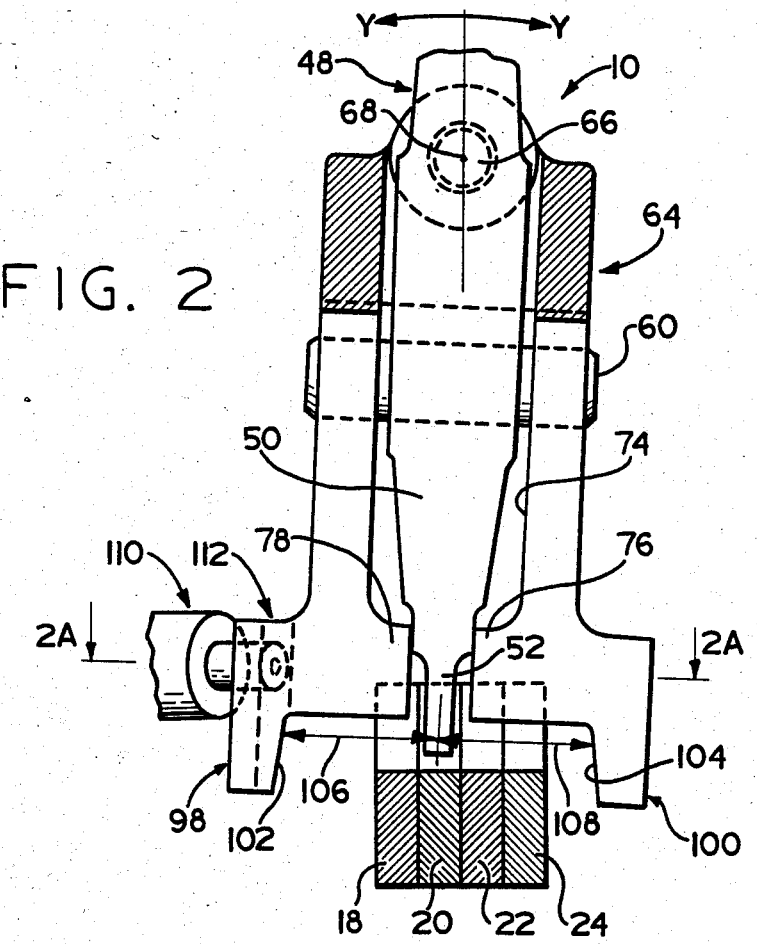

Certain terms will be utilized in the following description of the preferred embodiment of the present invention and are not intended to be limiting. The terms "forward" and "rearward" refer to directions in the transmission shifting mechanism of the present invention as conventially mounted in a vehicle. The terms "upward", "downward", "rightward" and "leftward" refer to directions in the drawings to which reference is made. The terms "inward" and "outward" refer to directions toward and away from, respectively, the geometric center of a device being described. The above applies to modifications of the terms above specifically mentioned and to terms of similar import.

Multi-speed change gear transmissions of both the sliding gear type wherein selected gears are moved into meshing engagement other gears and of the sliding clutch type wherein constantly meshed gears are selectively clutched to a shaft by means of an axially slidable clutch are well known in the prior art and examples thereof may be seen by reference the above mentioned U.S. Pat. Nos. 4,273,004; 3,387,501 and 4,296,642. In such transmissions, the slidable gear or clutch member (not shown) is provided with a groove in which a shift fork or shift yoke or other shifting element is received for imparting a selective axial movement thereto. The shift forks or yokes are typically carried by, or at least selectively axially moved by, an axially moveable shift rail or shift bar. The shift rail and shift fork carried thereby typically have an axially centered or nondisplaced neutral position and are moveable in a first and possibly a second axial direction therefrom to engage a first and possibly a second selected gear. Accordingly, in transmissions of this type, one shift rail and shift yoke is required for at least every pair of selectively engageable gears. Typically, the transmission shifting mechanism includes a shift bar housing assembly mounted to the transmission, usually at the top of the transmission housing, which slideably supports a plurality of axially moveable shift rails each of which shift rails carries a single shift fork or shift yoke for axially movement therewith. A transmission shifting control mechanism is typically mounted to the shift bar housing assembly for imparting a selected axial movement to a selected one of the axially moveable shift rails.

Figure 5A:
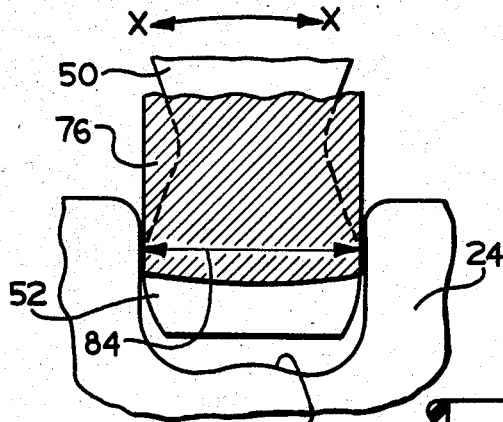
FIG. 5A is a fragmentary view, partially in section, taken substantially along line 5A—5A in FIG. 4.
Figure 5:
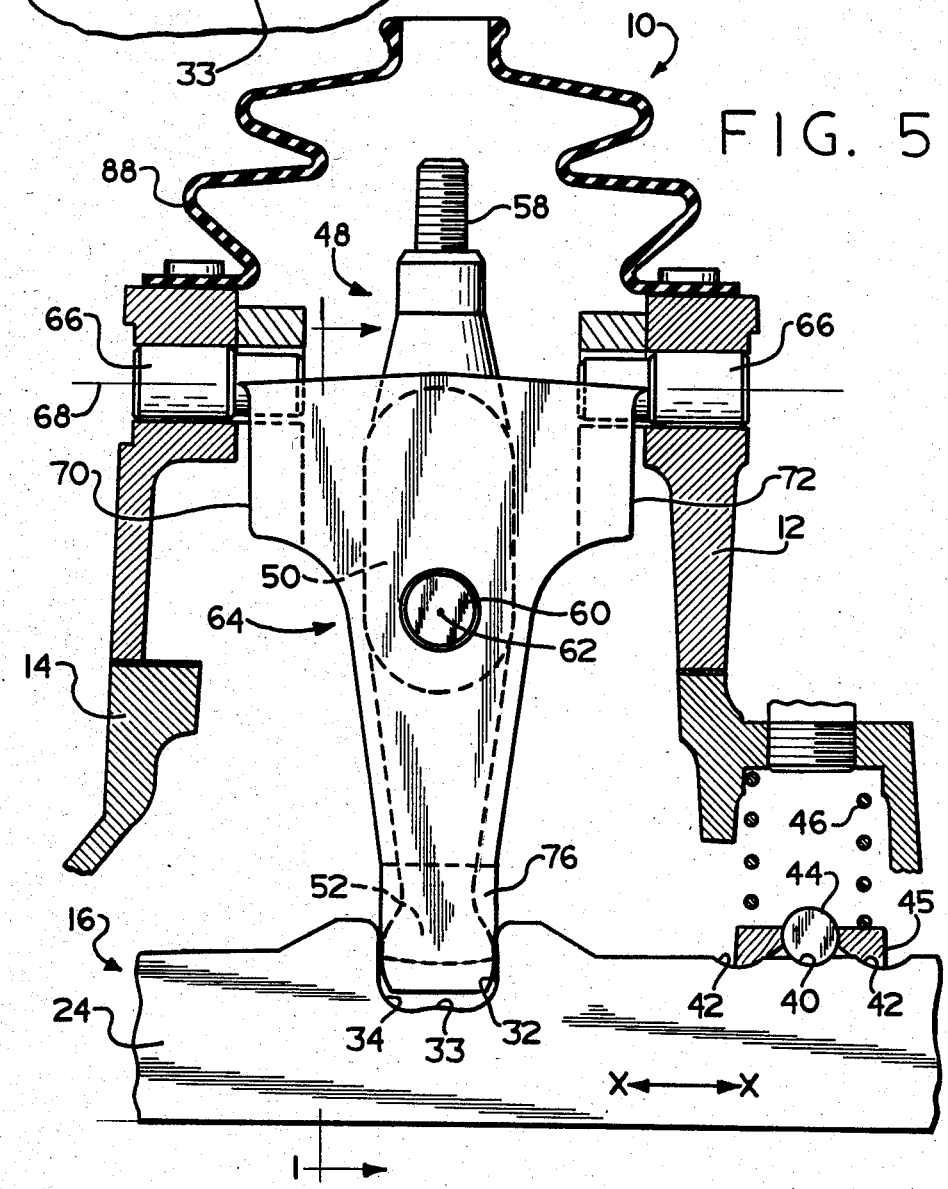
FIG. 5 is a fragmentary side view of the shifting mechanism illustrated in FIGS. 1-4.

The transmission shift control mechanism 10 of the present invention may be seen by reference to FIGS. 1-5. The control mechanism 10 includes a control housing 12 which is directly mountable to a shift bar housing 14 which is typically directly mountable to a transmission housing (not shown) at the top thereof. Of course, the shift bar housing 14 and control housing 12 may be integral. By way of illustration only, and not of limitation, the shift bar housing 14 encloses a shift bar housing assembly 16 for utilization with a six forward speed and one reverse speed transmission and includes four generally cross-sectionally rectangular flat shift rails 18, 20, 22 and 24 axially slidable in the shift bar housing 14. Shift rail 18 is the reverse speed shift rail, shift rail 20 is the first and second speed shift rail, shift rail 22 is the third and fourth speed shift rail and shift rail 24 is the fifth and sixth speed shift rail. Typically, each of the shift rails carries a shift fork or shift rail axially fixed thereto for movement therewith, or at least axially moved thereby, as is well known in the art. As is known, and as indicated above, transmission shifting, or gear engagement, is accomplished by selective axial movement of a selected one of the shift rails from the axial nondisplaced neutral positions thereof as illustrated in FIG. 5.

Figure 6:
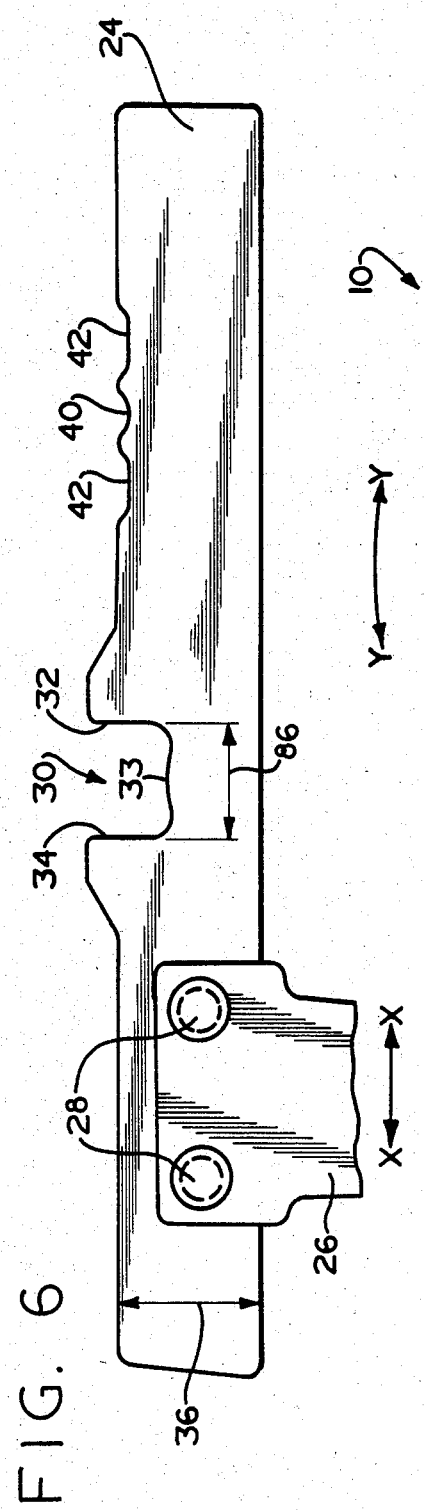
FIG. 6 is a fragmentary view of a shift rail/shift yoke assembly for shift bar housings of the type advantageously utilizing the shift control mechanism of the present invention.

The structure of a typical shift rail/shift yoke assembly may be appreciated in greater detail by reference to FIG. 6 wherein the shift rail 24 and a shift yoke 26 assembly is illustrated in greater detail. As is seen, the generally flat shift rail 24 is rigidly attached to the shift yoke 26 by means of rivets 28 or other fastening means whereby shift rail 24 and shift yoke 26 will move together axially in both the forward and rearward directions. The forward and rearward axial direction is indicated by arrow X—X and is the shifting or gear engagement direction of the transmission shifting mechanism. Shift rail 24, as well as shift rails 18, 20 and 22, each define a transversely extending shift finger notch, also called a shift block notch, 30 having sidewalls 32 and 34 which are engageable by a shift finger for imparting a desired axial movement in the direction of arrows X—X to the shift rail and shift yoke carried thereby. Notch 30 is also defined by a bottom wall 33. As may be seen, the shift finger notches of shift rails 18, 20 and 22 have been assigned reference numerals 30A, 30B and 30C, respectively. As may be seen by reference to FIG. 5, when all of the shift rails are in the neutral position, the shift finger notches thereof are aligned. The shift finger notches may be provided directly in the shift rails or may be provided in members carried by the shift rails. Each of the shift rails is of a generally uniform cross-section having a height 36 and a width 38.

On the upper surfaces thereof, and axially spaced from the shift finger notches, each of the shift rails carries a neutral detent notch 40 and at least one in-gear detent notch 42 closely axially spaced to the neutral detent notch. The neutral detent notches 40 extend throughout the width of each of the shift rails as do the in-gear detent notches 42 and the neutral detent notches on each of the shift rails are aligned when each of the shift rails are in the neutral position. The in-gear detent notches 42 are spaced from the neutral detent notches 40 by an axial distance generally equal to the axial movement of a shift rail from the neutral position to the in-gear position thereof so that the in-gear detent notch of a shift rail in the in-gear position thereof will align with the neutral detent notches on the other shift rails. As may be seen by reference to FIG. 5, a detent shaft 44 is received in carrier 45 which is biased inwardly by spring 46 to resiliently engage the neutral detent notches and/or the in-gear detent notch of an axially displaced shift rail. The single detent shaft for pin 44 may be of any suitable cross-sectional shape and has a length greater than the combined width of the shift rails. Detent shaft 44 will engage the neutral detent notches 40 provided in the shift rails to resiliently position all of the shift rails in the neutral position thereof, and, upon axial movement of a selective one of the shift rails to an in-gear position, will also engage the in-gear detent notch 42 of the selected shift rail to resiliently maintain the selected shift rail in the in-gear position to resist the effects of shift lever whipping and the like.

Although the shift control mechanism 10 of the present invention is especially well suited for use in connection with shift bar housing assemblies of the type described above, it is understood that the shift control assembly of the present invention may be utilized with other types of shift bar housing assemblies. Specifically, although flat shift rails are illustrated, the control 10 is also advantageously utilized with shift bar housing assemblies utilizing cross-sectionally round shift rails.

Shift control mechanism 10 includes a shift lever assembly 48 pivotably mounted in the control housing 12 for pivotal movement in a first direction designated by arrows X—X parallel to the axes of the shift rails and in a transverse direction designated by arrows Y—Y. In the embodiment illustrated, the shift lever assembly 48 includes a lower portion 50 carrying the shift finger 52 at the lower end thereof for engagement with the shift notches and an upper elongated portion 54 typically carrying a shift knob 56 at the upper end thereof for engagement by the vehicle operator. Knob 56 may, of course, be of any shape adapted for gripping by the operator. Lower shift lever portion 50 is provided with a threaded connector 58 at the upper end thereof for threaded engagement with the upper shift lever portion 54. Other means of connecting the lower portion 50 to the upper portion 54 may be utilized. Of course, as is perhaps more typical in the prior art, shift lever assembly 48 may be of a one piece construction. As is known for transmissions of this type, shift control mechanism is effective to engage a selected gear by selective axial movement of a selected shift rail in the direction of arrows X—X and locking of the remaining shift rails in the neutral position thereof which is accomplished by selective pivotal movement of shift finger 52 in the gear selection direction designated by arrows Y—Y and then pivotal movement of shift finger 52 in the gear engagement direction designated by arrows X—X. As is also well known, especially when shifting a synchronized heavy duty transmission, a considerably greater force is required when pivoting the shift finger 52 in the gear engagement direction, X—X, than in the selection direction, Y—Y. As shift levers are effectively levers of the first class type, providing a lever with a single pivot point or focrum for pivotal movement in both directions of pivot motion and with sufficient mechanical advantage in the gear engagement mode of operation might result in the lever having an undesirably long travel or throw in the selection mode of operation. Conversely, minimizing shift lever travel in the selection mode of operation might result in a lever having less than desired mechanical advantage in the gear engagement direction.

Shift lever member 50 is pivotably supported for pivotal movement in the gear engagement direction as indicated by arrow X—X on a pivot mount such as pivot pin 60 for pivotable movement about pivot axes 62. Pivot pin 60 is fixedly supported in a shift yoke member 64 which shift yoke member 64 is pivotably supported at a pivot mount such as pivot pins 66 retained in the control housing 12 for pivotable movement about pivot axes 68 in the selection direction or the direction designated by arrows Y—Y. It is important to note that pivot pin 60 permits pivotal movement of shift lever member 50 relative to the shift yoke member 64 in only the X—X direction while pivot pins 66 permit pivotal movement of shift yoke member 64 relative to control housing 12 in only the Y—Y direction. Accordingly, as may be seen by reference to FIGS. 1-5, movement of the shift lever assembly 48 in the selection direction will result in the shift lever member 50 and shift yoke member 64 pivoting about pivot axis 68 as a unit whereas movement of the shift lever assembly 48 in the gear engagement direction will result in the shift lever member 50 pivoting about pivot axis 62 relative to the shift yoke member 64.

Shift yoke member 64 includes two generally parallel sidewalls 70 and 72 in which pivot pins 66 are received to pivotably mount the yoke member 64 to the control housing 12. Each of the sidewalls 70 and 72 is provided with a centrally located downwardly opening slot 74 through which the pivot pin 60 extends and in which the shift lever member 50 is pivotably moveable in the X—X gear engagement direction. At its lower end, slot 74 is defined by two inwardly extending projections 76 and 78 which are transversely separated by a distance 80 to define a gap 82 through which the shift finger 52 is pivotably moveable. The width 80 of gap 82 is of a transverse width which is greater than the transverse thickness 38 of one shift rail but less than the combined transverse thickness of two shift rails. Inwardly extending projections 76 and 78 are of an axial thickness 84 which is less than the axial length 86 of the shift notches 30 and are spaced from the pivot axes 68 by a distance allowing the projections 76 and 78 to pass through the shift notches in the Y—Y direction of pivotable movement of shift yoke 64.

As may be seen by reference to FIGS. 1-4, pivotal movement of the shift lever assembly 48 in the gear selection direction, Y—Y, will result in pivotable movement of shift yoke member 64 therewith. Such pivotable movement to align the shift finger 52 with any one of the selected shift rails, 18, 20, 22 or 24, will result in gap 82 also aligning with the selected shift rail allowing passage of the selected shift rail in the gear engagement, X—X, direction through the gap 82 while the inwardly extending protections 76 and 78 will be in interferring engagement with all of the remaining shift rails to lock same in the axially centered or nondisplaced neutral positions thereof. Accordingly, alignment of the shift finger 52 with a selected shift rail by pivotal movement of the shift lever member 50 and the shift yoke member 64 in the direction of arrow Y—Y will also align gap 82 with the selected shift rail allowing axial movement of selected shift rail from the neutral position thereof while simultaneously positioning projections 76 and 78 into interferring engagement with the interlock notches 30 of the remaining shift rails thereby preventing axial movement of the remaining shift rails. Thus, a relatively simple, inexpensive and reliable interlock mechanism is provided which does not rely upon sliding movement of pin members or ball members, does not rely upon spring bias means and does not rely upon relatively complicated plate structures has been provided.

Upon proper selection of a desired shift rail, engagement of a desired gear is accomplished by pivotably moving shift level assembly 48 in the gear engagement or X—X direction causing the shift lever portion 50 to pivot about pivot pin 60 relatively to the shift yoke member 64 as may be seen by reference to FIG. 5. Such pivotal motion in the X—X direction will result in the shift finger 52 engaging either the sidewall 32 or 34 of the shift notch 30 to impart a desired axial movement to the selected shift rail and shift yoke carried thereby as is well known in the prior art. The transverse dimension 80 of gap 82 defined by inwardly extending projections 76 and 78 will permit axial movement of the selected shift rail through the gap 82 while the projections 76 and 78 will be in interferring engagement with the remaining rails to prevent axial movement thereof. As may be seen, control housing 12 may include a boot or seal member 88 fixed thereto as is well known in the prior art.

Figure 7:
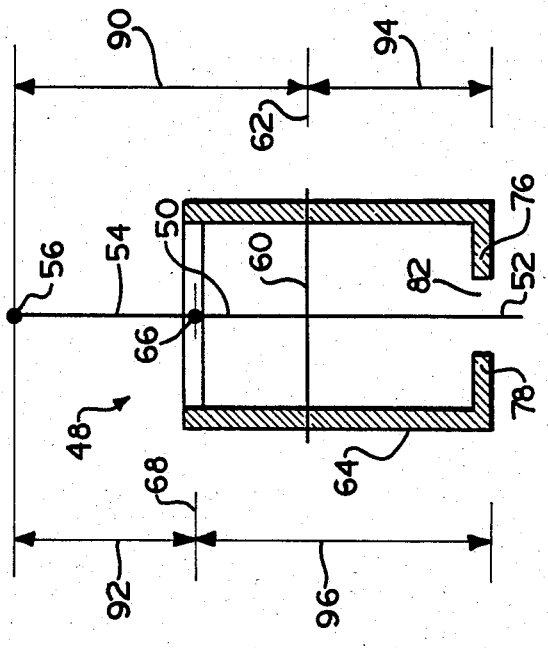
FIG. 7 is a schematic illustration of the shift control mechanism of the present invention illustrating the mechanical advantage of the "gear selection" and "gear engagement" modes of operation.

As has been discussed above, and as may be appreciated in greater detail by reference to FIG. 7, pivotal movement of the shift lever 48 in the direction of arrows Y—Y to align the shift finger 52 and gap 82 with a selective shift rail is usually referred to as the selection operation of the shift control mechanism 10 and results in the shift lever 54 and shift yoke member 64 pivoting as a unit about pivot axis 68. Movement of the shift lever 48 in the direction of arrow X—X to cause an axial movement of a selected shift rail results in pivotal movement of shift lever member 50 about pivot axis 62 relative to the shift yoke member 64 and control housing 12. Accordingly, the pivotal movement of the shift finger 52 in the selection direction is independent from pivotal movement of shift finger 52 in the engagement direction and occurs about two separate and independent pivot or fulcrum axes, 62 and 68. As pivot axis 62 is spaced from shift knob 56 by a distance 90 which is greater than the distance 92 by which pivot axis 68 is spaced from shift knob 56 and as shift finger 52 is spaced from pivot axis 62 by a distance 94 which is less than the distance 96 by which shift finger 52 is spaced from pivot axis 68, it may be seen that the mechanical advantage of shift control 10 in the gear engagement mode of operation, which is defined by distance 90 divided by distance 94, is greater than the mechanical advantage of shift control 10 in the selection mode of operation, which is defined by distance 92 divided by distance 96. Accordingly, shift control assembly 10 provides a relatively simple, inexpensive and reliable structure for shifting a plurality of shift rails in a shift bar housing which utilizes separate and independent pivot or fulcrum axes for the selection and engagement modes of operation and thereby allows the mechanical advantage obtainable and shift knob travel required for each mode of operation to be independently designed to meet the particular requirements of shifting a given transmission and/or vehicle structure.

Figure 8:
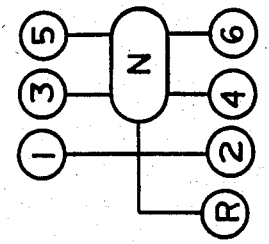
FIG. 8 is a schematic illustration of the shift pattern of the present invention.

A typical shift pattern for a transmission utilizing the shift control assembly 10 of the present invention may be seen by reference to FIG. 8 wherein a shift pattern for a six forward speed, one reverse speed transmission is schematically illustrated.

To select either fifth or six speed operation of the transmission, the shift finger 52 and gap 82 should align with shift rail 24. Similarly, for third or fourth speed operation of the transmission alignment should be with shift rail 22, for first or second speed operation alignment should be with shift rail 20 and for reverse operation alignment should be with shift rail 18. To assure proper operation, it is important that the operator be provided with an indication or feel that the shift finger 52 and gap 82 are properly aligned with the desired shift rail. For safety purposes, it is also desirable that selection of the reverse shift rail require movement against a relatively large resistance and that the shift finger 52 be resiliently urged out of alignment with the reverse shift rail.

As may best be seen by reference to FIGS. 1-4, shift yoke member 64 carries a pair of downwardly extending stop members 98 and 100 which define generally flat inner surfaces 102 and 104 which surround the shift rails 18, 20, 22 and 24 and extend downwardly from pivot axis 68 by a distance greater than the separation of pivot axis 68 from the bottom wall 33 of the shift finger notches 30 whereby pivotal movement of the shift yoke member 64 in the counter-clockwise direction is limited by engagement of inner surface 102 with shift rail 18 and in the clockwise direction is limited by engagement of inner surface 104 with shift rail 24. Of course, stops 98 and 100 could also be wider than length 86 of the notches 30 to assure engagement thereof with the shift rails. Inner surface 102 of stop member 98 is separated from shift finger 52 by a distance 106 (see FIG. 2) selected such that counter-clockwise movement of the shift yoke member 64 and shift finger 52 sufficient to align shift finger 52 and gap 82 with the righthand outer shift rail 24 will cause inner surface 102 to firmly engage shift rail 18 as may be seen by reference to FIG. 4. Inner surface 104 of stop member 100 is spaced from shift finger 52 by a distance 108 (see FIG. 2) selected such that clockwise pivotal movement of the shift yoke member 64 and shift lever member 50 in the clockwise direction sufficient to align shift finger 52 and gap 80 with the lefthand outer shift rail 18 will cause the inner surface 104 to firmly engage the righthand shift rail 24 as may be seen by reference to FIG. 1. Accordingly, inner surfaces 102 and 104 of stop members 98 and 100, respectfully, limit the extent of pivotal movement of the shift yoke member 64 and shift lever member 50 in the selection direction, as indicated by arrows Y—Y, and provides a firm positive indication of correct alignment with the selected outer shift rails, 18 and 24, for selecting either the reverse mode of operation or the fifth or sixth speed mode of operation of the transmission. Accordingly, verification of proper selection of the outer shift rails, 18 or 24, is accomplished by a positive stop of pivotal movement of the shift yoke member 64 and shift lever assembly 50.

To provide the operator with an indication or "feel" of proper selection of one of the two inner shift rails, 20 or 22, the shift control 10 is provided with a spring biased plunger assembly 110 which interacts with a notched or stepped contact surface indicated generally at 112 which is provided at a convenient location on the shift yoke member 64. The structure and operation of the plunger assembly 110 and notch surface 112 is described in detail below and may best be appreciated by reference to FIGS. 1A-4A taken in connection with FIGS. 1-4.

Plunger assembly 110 is received in a bore 114 provided in the control housing 12 or shift bar assembly housing 14 and includes a sleeve member 116 slideably retaining a plunger 118 and a spring 120 resiliently biasing the plunger 118 axially outwardly. A set screw 122 positions the sleeve 116 within bore 114 and acts as a spring seat for the spring 120. The plunger 118 includes a flange/spring seat section 124 to the axial extension thereof from sleeve 116 and a tip section 126 defined by an axially outwardly and radially inwardly extending ramp portion 128 and a relatively flat surface 130 at the axially outwardmost end thereof. Notched contact surface 112 includes a first flat portion 132, a second flat portion 134 and a third flat portion 136. Flat portion 134 extends inwardly from first flat portion 132 at an angle generally equal to the angle defined between ramp portion 128 and flat portion 130 of the plunger 118. Third flat portion 136 extends from the second flat portion 134 in the direction away from the first flat portion 132 and defines by an included angle with the second flat portion 134 generally equal to the included angle defined by the ramp surfaces 128.

Figure 3A:
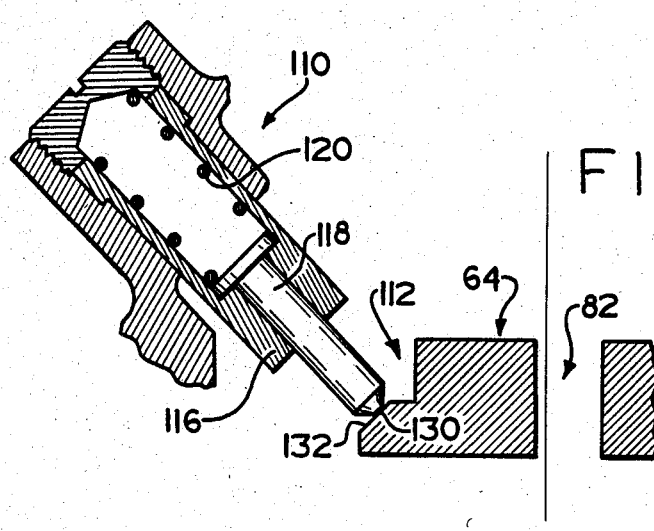
Figure 3:
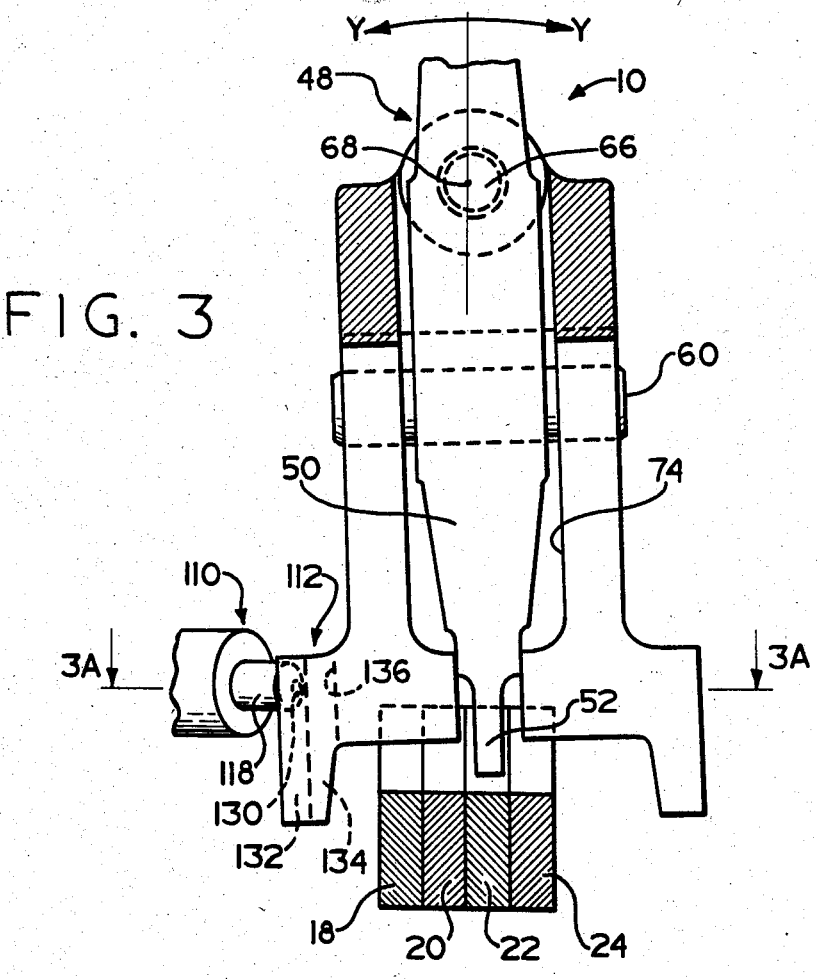

In operation, as may be seen by reference to FIGS. 1A-4A, the interaction of the plunger assembly 110 and the notched ramp surface 112 is as follows. Referring to FIGS. 4 and 4A, when the shift finger 52 and gap 82 are properly aligned with the fifth and sixth speed rail 24, the plunger 118 is not in contact with the ramped contact surface 112 and proper selection of the rail 24 is indicated by the contact of inner surface 102 of stop 98 with the lefthand outer shift rail 18. As may be seen by reference to FIGS. 3 and 3A, when the shift finger 52 and gap 82 properly align with the third and fourth speed rail 22, the flat surface 130 of the tip 126 of plunger 118 will just contact the first portion 132 of the ramp surface 112. This initial contact of the ramp surface 112 with the spring biased plunger 118 will provide a positive indication to the operator that the shift rail 22 has been correctly selected. As may be seen be reference to FIGS. 2 and 2A, when the shift finger 52 and gap 82 are properly aligned with the first and second speed shift rail 20, the tip 126 of the spring biased plunger 118 will be positioned in the stepped notch defined between the second and third portions 134 and 136 of notch contact surface 112 with the ramp surfaces 128 of the tip 126 in contact with both the second and third surface portions 134 and 136. This seating of the tip 126 into the notch defined by surface portions 134 and 136 provides the operator with a positive indication that the shift rail 20 has been properly selected as further clockwise pivotal movement of the shift yoke member 64 and shift lever 50 requires a considerably, or at least noticeably, greater force. Accordingly, it may be seen that a positive indication to the operator of correct selection of the inner shift rails 20 and 22 is provided by use of the spring bias plunger assembly 110 and ramp contact surface 112.

As may be seen by reference to FIGS. 1 and 1A, alignment of the shift finger 52 and gap 82 with the reverse shift rail 18 is positively indicated by contact of inner surface 104 of stop member 100 with the righthand outer shift rail 24. Movement of the shift lever to this position will result in the spring 120 which outwardly biases plunger 118 being further compressed as ramp surface 128 of plunger tip 126 slides along surface portion 136 from the notch illustrated in FIG. 2A to the position illustrated in FIG. 1A. This further retraction of the plunger 118 provides a desirably high resistance to selection of the reverse shift rail 18 to prevent accidental selection thereof and further provides a mechanism whereby the shift yoke 64 and shift finger 52 will be positively pushed out of alignment with the reverse shift rail 18 if not positively retained thereat against the resistance of the spring bias. Of course, the spring constant of spring 120 and the angles of ramp portion 128 of tip 126 and of contact surface portions 132, 134 and 136 may be varied to provide desirable operational characteristics.

As may be seen, applicants have provided a new and improved directly mounted transmission shift control mechanism which provides a relatively simple but positive interlock mechanism, which utilizes independent pivot axes or fulcrums for pivotal motion in the selection and engagement modes of operation to allow independent mechanical advantage of the mechanism in the selection and engagement modes of operation and which provides the operator varification of proper selection of a desired shift rail in a transmission utilizing three or four shift rails.

It is understood that various changes in the details and arrangements of the components of the above described embodiment may be resorted to without departing from the spirit and the scope of the invention as hereinafter claimed.

We claim:

1. A shift control mechanism for use in cooperation with a transmission shift bar housing assembly comprising a shift bar housing mountable to a transmission housing and a plurality of substantially parallel generally equal transverse width shift rails mounted for selective axial movement in said shift bar housing, each of said shift rails operatively connected to shift elements for engaging and disengaging selected transmission gears and having an axially nondisplaced neutral position and at least one axially displaced in-gear position, each of said shift rails having means defining a transversely extending shift notch on the upper surfaces thereof adapted for engagement by a shift finger, all of said shift notches aligning when all of said shift rails are in an axially nondisplaced neutral position, said shift control mechanism comprising:

a control housing mountable to said shift bar housing;

a shift yoke member pivotably supported in said control housing on a first pivot axis extending generally parallelly to the axes of said shift rails for pivotal movement in a plane transverse the axes of said shift rails;

a shift lever-shift finger member including a shift finger engagable with said shift notches, said shift lever-shift finger assembly pivotably supported in said shift yoke member on a second pivot axis extending generally transverse the axes of said shift rails for pivotal movement relative to said shift yoke in a plane substantially parallel to the axes of said shift rails, said shift lever-shift finger member comprising a first class lever having a first portion extending from said second pivot axis toward said shift rails and terminating at said shift finger and a second portion extending from said second pivot axis outwardly from said control housing and away from said shift finger and terminating at a shift knob;

said shift yoke member defining a slot extending substantially parallel to the axes of said shift rails through which said shift finger is pivotably moveable, the portion of said shift yoke member adjacent said shift finger of a radial separation from said first pivot axis and of an axial thickness permitting passage of said portion of said shift yoke member through said shift notches, the width of said slot adjacent said shift finger greater than the thickness of one shift rail but less than the combined thickness of two shift rails;

whereby pivotal movement of said shift knob in the direction transverse the axes of said shift rails will result in said shift yoke member and said shift lever-shift finger member pivoting as a unit about said first pivot axis, pivotal movement of said shift lever knob in a plane parallel to the axes of said shift rails will result in said shift lever-shift finger member pivoting about said second pivot axis relative to said shift bar housing, said slot in said shift yoke member will permit axial movement therethrough of a shift rail aligned therewith from the axially nondisplaced position of said aligned shift rail and said portion of said shift yoke member will prevent axial movement from the axially nondisplaced positions of the shift rails not aligned with said slot;

said shift yoke member carrying a first stop member extending from one transverse side thereof and a second stop member extending from the other transverse side thereof, said first stop member adapted to engage the shift rail closest thereto upon pivotal movement of said shift yoke member sufficient to align said shift finger and said slot with the shift rail closest the second stop member and said second stop member adapted to engage the shift rail closest thereto upon pivotal movement of said shift yoke member sufficient to align said shift finger and said slot with the shift rail closest said first stop member.

2. The control mechanism of claim 1 wherein said shift rails are substantially flat and located in side-by-side relationship within said shift bar housing.

3. The control mechanism of claim 1 wherein said shift rails comprise four generally flat shift rails located in side-by-side relationship, and further comprising a notched detent surface provided on said yoke member and a spring biased plunger member extending from one of said control housing and shift bar housing, said spring biased plunger engageable with said notch engagement surface and moveable from a fully extended position against the bias of said spring to a variably retractive position by engagement with said engagement surface, said spring biased plunger not contacting said notched contact surface when said shift finger is aligned with said shift rail closest said second stop member, said spring biased plunger initially contacting said notch engagement surface when said shift finger is aligned with the shift rail adjacent said shift rail closest said second stop member and said spring biased plunger retracted against said spring bias and contacting said notch in said notched engagement surface when said shift finger is aligned with the shift rail adjacent said shift rail closest said first stop member.

4. The control mechanism of claim 3 wherein said notch surface comprises a stepped notch defining an included angle therein and the outermost end of said spring biased plunger is provided with a tapered tip thereon defining an included angle generally complimentary with the included angle defined by said stepped notch.

5. A shift control mechanism for use in cooperation with a transmission shift bar housing assembly comprising a shift bar housing mountable to a transmission housing, a first shift rail mounted in said shift bar housing for axial movement relative thereto, a second shift rail mounted in said housing for axial movement relative thereto and displaced from said first shift rail in a first transverse direction, a third shift rail mounted in said housing for axial movement relative thereto and displaced from second shift rail in said first transverse direction and a fourth shift rail mounted in said housing for axial movement relative thereto and displaced from said third shift rail in said first transverse direction, each of said shift rails operatively connected to shift elements for engaging and disengaging selected transmission gears and having an axially nondisplaced neutral position and at least one axially displaced in-gear position, each of said shift rails having means defining a transversely extending shift notch on the upper surfaces thereof adapted for engagement by a shift finger, all of said shift notches aligning when all of said shift rails are in an axially nondisplaced neutral position, said shift control mechanism comprising:

- a control housing mountable to said shift bar housing;
- a shift lever mounted in said control housing for pivotal movement in the direction substantially parallel to the axes of said shift rails and for pivotal movement in the direction substantially transverse the axes of said shift rails, said shift lever carrying a shift finger on the inner end thereof for engagement with said shift notches;
- a contact member pivotably mounted in said control housing for pivotal movement with said shift lever in the direction transverse the axes of said shift rails, said contact member defining a stepped contact surface thereon comprising a first portion, a second portion extending from said first portion and a third portion extending from said second portion; and
- a spring biased detent plunger extending from one of said shift bar housing and control housing towards said contact surface, said plunger biased by a spring to fully extend from said one of said housings and engageable by said contact surface to be retracted into said housing against the bias of said spring, said plunger engageable with said first surface in the fully extending position thereof when said shift finger is aligned with said third shift rail and said plunger retracted into said one of said housings and engageable with the intersection of said second and third portions of said contact surface when said shift finger aligns with said second shift rail.

6. The shift control mechanism of claim 5 wherein said contact member includes a first stop member engageable with said first shift rail when said shift finger is aligned with said fourth shift rail to limit pivotal movement of said shift lever in said first transverse direction and a second stop member engageable with said fourth shift rail when said shift finger is aligned with said first shift rail to limit pivotal movement of said shift lever in said other transverse direction.

7. The control mechanism of claim 6 wherein the end of said plunger is provided with a tapered surface defining an included angle substantially equal to the included angle defined by the intersection of said second and third portions of said contact surface.

8. The control mechanism of claim 7 wherein said tapered tip of said plunger member terminates at a flat surface generally perpendicular to the axis of said plunger and the included angle between said flat surface and said tapered portion of said tip is substantially equal to the included angle between said first and second portions of said contact suface.

9. The shift control mechanism of claim 8 wherein alignment of said shift finger with said first shift rail will cause said plunger to slideably engage said third portion of said contact surface at a point displaced from said intersection of said second and third portions of said contact surface.

10. The control mechanism of claim 7 wherein said shift rails are of substantially rectangular cross-section and are mounted in side-by-side relationship within said shift bar housing assembly.

11. The control assembly of claim 10 wherein said contact member carries interlock means therewith permitting axial movement of the shift rail aligned with said shift finger from the axially nondisplaced position thereof but preventing axial movement of the other shift rails from the axially nondisplaced positions thereof.

12. The shift control mechanism of claim 11 wherein said shift lever is pivotably mounted in said contact member for pivotal movement relative to both said contact member and said control housing in the direction substantially parallel to the axes of said shift rails.

13. The shift control mechanism of claim 12 wherein said interlock means comprises a pair of transversely inwardly extending projections carried by said contact member and defining a slot therebetween through which said shift finger pivots, said slot having a transverse width greater than the transverse width of one shift rail but less than the combined transverse width of two shift rails.

* * * * *